United States Patent
Carpenter et al.

(10) Patent No.: US 7,941,378 B2
(45) Date of Patent: May 10, 2011

(54) STAMP TESTING AND MONITORING

(75) Inventors: Michael D. Carpenter, Arlington, TX (US); John J. Mampe, Palm Coast, FL (US); Stanley W. Sipe, Mansfield, TX (US)

(73) Assignee: Siemens Industry, Inc., Alpharetta, GA (US)

( * ) Notice: Subject to any disclaimer, the term of this patent is extended or adjusted under 35 U.S.C. 154(b) by 0 days.

(21) Appl. No.: 12/454,384

(22) Filed: May 15, 2009

(65) Prior Publication Data

US 2009/0285448 A1 Nov. 19, 2009

Related U.S. Application Data

(60) Provisional application No. 61/053,897, filed on May 16, 2008.

(51) Int. Cl.
*G06F 17/00* (2006.01)
(52) U.S. Cl. .......... 705/62; 705/400; 705/408; 382/101; 382/112; 382/137; 382/191; 235/379
(58) Field of Classification Search .................. 382/101, 382/135; 705/1, 401, 62; 356/71
See application file for complete search history.

(56) References Cited

U.S. PATENT DOCUMENTS

| | | | | |
|---|---|---|---|---|
| 4,601,057 A | * | 7/1986 | Tsuji et al. ..................... | 382/172 |
| 5,790,693 A | * | 8/1998 | Graves et al. .................. | 382/135 |
| 5,918,960 A | * | 7/1999 | Hopwood et al. .............. | 356/71 |
| 5,974,150 A | | 10/1999 | Kaish et al. | |
| 5,992,601 A | * | 11/1999 | Mennie et al. ................. | 194/207 |
| 6,014,453 A | * | 1/2000 | Sonoda et al. ................. | 382/137 |
| 6,058,190 A | * | 5/2000 | Cordery et al. ................. | 380/51 |
| 6,155,605 A | * | 12/2000 | Bratchley et al. .............. | 283/72 |
| 6,246,061 B1 | | 6/2001 | Ramsey et al. | |
| 6,373,965 B1 | * | 4/2002 | Liang ............................ | 382/112 |
| 6,398,106 B1 | * | 6/2002 | Ulvr et al. ..................... | 235/375 |
| 6,527,178 B1 | * | 3/2003 | Gordon et al. ................. | 235/385 |
| 6,841,092 B2 | * | 1/2005 | Paeschke et al. ...... | 252/301.4 R |
| 6,867,044 B2 | | 3/2005 | Cordery et al. | |
| 6,987,868 B1 | * | 1/2006 | Atarashi et al. ............... | 382/112 |
| 7,055,746 B2 | * | 6/2006 | MacKay et al. ......... | 235/462.04 |
| 7,089,420 B1 | | 8/2006 | Durst et al. | |
| 7,162,035 B1 | | 1/2007 | Durst et al. | |
| 7,529,386 B2 | * | 5/2009 | Denzer et al. ................. | 382/101 |
| 7,646,885 B2 | * | 1/2010 | Denzer et al. ................. | 382/101 |

(Continued)

OTHER PUBLICATIONS

"Parascript StampVerify," www.parascript.com published by web.archive.org on Nov. 21, 2006, pp. 1-2 of 2.*

(Continued)

*Primary Examiner* — John W Hayes
*Assistant Examiner* — Brian Epstein
(74) *Attorney, Agent, or Firm* — Filip A. Kowalewski (57) ABSTRACT

A method for detection of fraudulent postage indicia such as a stamp or permit marking includes an initial step of introducing a mail piece for processing on an automated facing and canceling machine and imaging the mail piece as it is being processed on the automated facing and canceling machine, which image includes an image of the postage indicia. The image is analyzed according to predetermined criteria stored in a database to determine if the postage indicia meets the predetermined criteria and therefore has an enhanced probability of being valid. If the analysis is step results in a determination that the postage indicia as an enhanced probability of being invalid, then the method involved determining that the information corresponds to counterfeit postage indicia; and storing the resulting information and decision in the database.

14 Claims, 5 Drawing Sheets

U.S. PATENT DOCUMENTS

| | | | |
|---|---|---|---|
| 7,748,748 B2* | 7/2010 | Gilfix | 283/83 |
| 2003/0059098 A1* | 3/2003 | Jones et al. | 382/135 |
| 2003/0084007 A1 | 5/2003 | Brookner | |
| 2003/0168849 A1* | 9/2003 | Reinisch | 283/72 |
| 2004/0003981 A1* | 1/2004 | Lee | 194/328 |
| 2004/0026498 A1* | 2/2004 | Fujioka | 235/379 |
| 2004/0054631 A1 | 3/2004 | Lang et al. | |
| 2004/0096081 A1* | 5/2004 | Denzer et al. | 382/101 |
| 2004/0105572 A1* | 6/2004 | Denzer et al. | 382/101 |
| 2004/0208373 A1* | 10/2004 | Aoki et al. | 382/191 |
| 2004/0230543 A1* | 11/2004 | Baker et al. | 705/401 |
| 2004/0247168 A1* | 12/2004 | Pintsov et al. | 382/137 |
| 2004/0247169 A1* | 12/2004 | Ross et al. | 382/137 |
| 2005/0091170 A1* | 4/2005 | Nambudiri | 705/62 |
| 2005/0278266 A1 | 12/2005 | Ogg et al. | |
| 2006/0041506 A1* | 2/2006 | Mason et al. | 705/42 |
| 2006/0117011 A1* | 6/2006 | Arbel | 707/9 |
| 2006/0186348 A1* | 8/2006 | Nguyen et al. | 250/484.4 |
| 2006/0259446 A1 | 11/2006 | Gilham | |
| 2006/0280353 A1* | 12/2006 | Yi | 382/135 |
| 2006/0282383 A1* | 12/2006 | Doran | 705/45 |
| 2007/0129957 A1* | 6/2007 | Elliott et al. | 705/1 |
| 2008/0042424 A1* | 2/2008 | Braun et al. | 283/71 |
| 2008/0085046 A1* | 4/2008 | Lee et al. | 382/137 |

OTHER PUBLICATIONS

Allied Electronics, "Counterfeit Detection Systems", http://www.alliedelectronics.com/Counterfeit-Detection_systems.html, Apr. 1, 2009, 2 pages.

* cited by examiner

STAMP TESTING AND MONITORING

This application claims priority of U.S. Provisional Application No. 61/053,897 filed May 16, 2008.

FIELD OF THE INVENTION

This invention relates to postage verification, specifically detection of fraudulent postage during postal processing.

BACKGROUND OF THE INVENTION

Postage stamps are a unique type of document in that the purchaser buys a one-time service to have a hard-copy document delivered by the postal service that issued the stamp. Counterfeiting of stamps presents a challenge to the counterfeiter because the value per document is comparatively low compared to other targets such as currency or bearer bonds. Large postal services can, however, be considered an attractive target due to the high volume of stamps produced, particularly for letter format mail. The US market, for instance, can have billions of stamps in a single series that are used primarily on letters. At a price of $0.44 and 10 billion per year issued a 2% rate of counterfeiting represents a $88,000,000 loss per year. Because the post must deliver the mail with the counterfeit stamp this is more than foregone revenue; it is a true bottom line loss.

When stamps are distributed by the post itself through local post offices, the distribution is well controlled and the opportunity for a counterfeiter to introduce large volumes of fake stamps is extremely limited. In some cases, the post may use a distribution network that is not tightly controlled such as stores, rental centers, etc. This gives an organized counterfeiter the opportunity to introduce high volumes of fake stamps. An example would be a chain of rental centers whose owner is in collusion with a counterfeiter. The fake stamps could be introduced and the sales kept "off the books" generating a profit nearing the face value of the stamps.

Luminescence detection has been used by the U.S. Postal Service (USPS) for the detection and orientation of stamps on mail pieces. The USPS has relied upon luminescence detection for almost 45 years to identify stamp authenticity and to orient letters processed by automatic sorting machines. This technique of tagging stamps with phosphorescent material was developed in the Netherlands in the late 1940s and early 1950s. A machine based on the Netherlands' design was purchased by the USPS as its first facer canceller. A later upgrade known as the Mark II facer canceller became the workhorse of the stamp cancellation process and remained in service for over 25 years. Its replacement, the advanced facer canceller system (AFCS) has boosted performance even more, but still uses the luminescence detection process to orient and determine where to cancel each mail piece.

In 1963, stamps tagged with phosphorescent ink were introduced to work with the facer canceller machine technology. Originally, two types of phosphorescence tagging were used: green taggants for First Class mail, and red taggants for airmail. Only the green is currently used. Postage meter manufacturers were encouraged to add phosphorescent inks to their products. The highly abrasive nature of the phosphorescent compounds shortened the life of the metering mechanisms and the meter manufacturers objected to this proposal. Work was done to develop fluorescent inks with non-particulate dyes that would fluoresce under the ultraviolet illumination of the detectors. These inks were introduced in the early 1970s.

The choice of phosphorescence for stamps and fluorescence for meters yielded another benefit. Phosphorescent inks continue to glow after the excitation illumination is turned off, but fluorescent dyes do not. The detection systems could take advantage of this property to discriminate between stamps and metered indicia. This technology has remained a cornerstone of facer canceller design to this day. In order to assure consistent quality of the stamps and meter marks, special purpose instrumentation was developed to measure the quantitative signal obtained when the stamp or indicium was exposed to specific wavelengths of ultraviolet light. The USPS "2C" meter has filled that role for about 30 years. Recently high quality counterfeit stamps have begun to appear in the mail. Such stamps are routinely reintroduced into the mainstream even if rejected for no phosphor at the facing and canceling equipment. The USPS at present makes no systematic effort to prevent counterfeit stamps and permit marks from passing through the mail stream.

When phosphorescent inks were first added to stamps, all of the printing was done exclusively by the Bureau of Engraving and Printing, Department of the Treasury. Over the past decade or two, the printing of stamps has been outsourced to multiple commercial printers. This has resulted in healthy competition and reduced printing costs with advanced technology and better equipment. It has also resulted in more complex quality control and inspection procedures and processes. Because there are only a limited number of 2C meters, the strain on maintaining quality is becoming a logistical issue.

Tagging stamps has proven to be reliable and cost effective, but it results in a process that cannot differentiate between types of stamps nor their values. High detection rates may be achieved, but not without some problems. For example, either stamps are tagged, or they are not; that is, stamps with a value of ten cents or higher are normally tagged, while lower denomination stamps are not. Since unused stamps have no expiration date and a stamp could be applied to a letter many years after its date of issue, it is possible to cancel older tagged stamps on mailpieces that do not contain sufficient postage. In contrast, a quantity of untagged stamps can be applied to an envelope to meet the revenue requirements, but be rejected by the detection system. From a philatelic perspective, this is common when stamp collections are broken up into valued and unvalued portions; the unvalued stamps are then used for postage. Other examples of tagging problems are low phosphorescent signals resulting from stamps that have been mistakenly run through the washing machine or from stamp designs with dark colors printed over pre-coated phosphorescent paper without the application of additional phosphorescent ink.

The Postal Inspection Service has long relied upon the phosphorescence in stamps to aid in determining whether stamps are counterfeit. Phosphorescent inks are not readily available and require offset or other commercial printing equipment for application. A common counterfeiting method is to digitize the image of a stamp and then print stamps with ink jet printers. These printers use dye-based inks that result in stamps that look very similar when viewed under normal lighting. However, under shortwave ultraviolet light they can be quickly identified as counterfeit.

Technology has advanced and a new method of stamp detection has been developed and is about to be deployed by the USPS. Siemens has developed a high-resolution color imaging camera system to identify stamps, metered indicia, and bar code patterns based on the information in the pattern. This Advanced Color Recognizer 2050 (ACR2050) is scheduled for deployment with the new Advanced Facer Canceller System (AFCS200). The present invention seeks to take advantage of this development.

SUMMARY OF THE INVENTION

A method for detection of fraudulent postage indicia such as a stamp or permit marking includes an initial step of introducing a mail piece for processing on an automated facing and canceling machine and imaging the mail piece as it is being processed on the automated facing and canceling machine, which image includes an image of the postage indicia. The image is analyzed according to predetermined criteria stored in a database to determine if the postage indicia meets the predetermined criteria and therefore has an enhanced probability of being valid. If the analysis results in a determination that the postage indicia as an enhanced probability of being invalid, then the method involves determining that the information corresponds to counterfeit postage indicia and storing the resulting information and decision in the database. A variety of techniques are described for the analysis step and the invention may involve re-imaging or measuring another characteristic of the postage indicia and comparing the measured characteristics to one or more reference standards in the database. Preferably at least two different analytical techniques are used, one based on overt characteristics and the other based on a covert characteristic. Among other things, the present invention recognizes stamps based on their pictorial design and color properties and thereby offers the opportunity to phase out phosphorescent inks and paper.

It has been determined as part of the present invention that an additional high-resolution camera biased to the infrared spectrum could offer significant protection to the USPS and other federal postal services. It would also enable printing additional information on stamps that could identify the contractor and date of issue in addition to the value and stamp type. The addition of new security features and the higher resolution camera provides a federal postal service like the USPS with the opportunity to verify the authenticity of questionable stamps off-line. These and other aspects of the invention are discussed further in the detailed description that follows.

BRIEF DESCRIPTION OF THE DRAWING

In the accompanying drawings, wherein like numerals indicate like elements.

DETAILED DESCRIPTION

Methods of the invention are provided to validate stamps and detect anomalies during cancellation. This system comprises automatic on-line recognition and a combination of automated and manual off-line functions. Advantages conferred include rapid and low cost testing for stamp authenticity, invalid IBIP (stamps and meters), insufficient postage, improved recognition and facing performance, phase out and elimination of phosphorescent papers used in stamps, dramatic improvements in stamp screening effectiveness, and minimized impact on the value of stamps to stamp collectors.

Validating the authenticity of stamps is not unlike validating any object whose actual value is not intrinsic. Currency is a good example: the intrinsic value of a one dollar bill is not significantly different from a five dollar bill, but their actual worth is prescribed higher than the intrinsic value of either. The cost of producing the five dollar bill is the same as the one, but the higher valued currency would be the more likely target for counterfeiting. Thus, adding security features to the five dollar bill would take precedence over that of the one dollar bill. It is proposed according to the invention that stamps follow a similar pattern. The most recent issues, and those of higher denominations (first class postage or higher) are the likely targets for counterfeiting. This provides the opportunity to add security features as new stamps are issued and providing upgraded detection systems to assure that the mail processing system is not compromised.

For the first time, a stamp catalog will be used to validate stamps. This process has demonstrated very high recognition rates and provides an upgrade path for further enhancements that utilize its unique detection capabilities. It also offers the potential to eliminate the phosphorescent inks used in pre-coated papers and the alternative method of overprinting stamps with phosphorescent ink varnish. Recently, the specific phosphorescent pigment used for the production of phosphorescence coated paper and phosphorescent overcoat vanish have become more difficult to acquire. The side benefit to this potential cost savings is the elimination of the USPS 2C phosphor meter and the associated logistical support costs.

Currently there is no "intelligence" in the stamp cancellation process. Stamps are canceled if tagged, and rejected if they do not contain a taggant. No stamp type or value information is obtained during the process. Since the ACR can uniquely identify a stamp, it can also provide its value. When the same design is issued at different values, other techniques are required if stamp value information is to be determined.

There is utility in obtaining the stamp value during the cancellation process using an automated system, especially in the unique case of "Forever" stamps. The inventory of existing Forever Stamps will be re-valued at the new rate as the rate changes, but the design will not change with the exception of the year date for new printings; e.g., 2007 changes to 2008. To improve accounting and security usable for stamps such as Forever stamps, a number of measures can be taken. One of these is Advanced Color Recognition or "ACR". Advanced Color Recognition uses feature and color data obtained from the stamp detection as a validity signature. Microprinting, as one form of stamp feature, embeds minute information into the stamp design, the size of which is difficult to photocopy.

Matrix Coding is another method for creating enhanced information content in stamps. This method uses carbon black inks or other inks with infrared (IR) absorption for a portion of the stamp design.

According to one aspect of the invention, greatly enhanced stamp security is achieved by a combination of overt and covert measures. For purposes of the invention, overt measures refer to detection and analysis of readily discernable characteristics of the stamp. Covert measures refer to introducing one or more new characteristics to the stamp which cannot be readily detected, i.e. require special equipment to detect.

Advanced Color Recognition (ACR) is one method that can be used to implement overt security measures. The ACR2050 system captures the complete image of a letter mailpiece as it travels down the transport. Two cameras are necessary to capture both sides of each mailpiece. The cameras process image data primarily in the human visual domain. The system processes all the areas of interest and the data to determine the location of the postage indicia as well as indicia type. Other areas on the mailpiece are classified for postal processing (address, return address, business reply data, bar code decoding, etc.).

According to one aspect of the invention, a computerized catalog is developed of scanned stamp issues. The camera image is used to locate stamps anywhere on the envelope and compare them to catalog entries based on the graphical pattern of the stamp. This is done independently of stamp orientation and uses both feature recognition and color space techniques to characterize the stamp pattern. This step does not rely on luminescence. The value of each stamp is determined by reference and comparison to stamp catalog data entries.

Figure 1A:
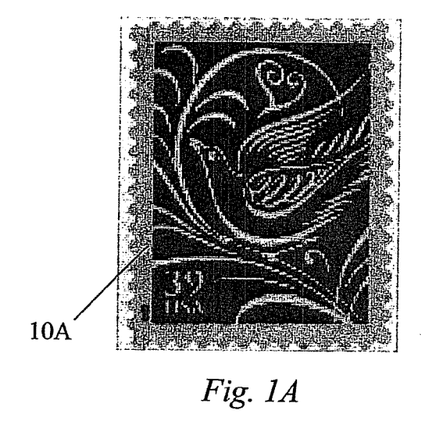
FIGS. 1A and 1B are black and white representations of colored stamps.
Figure 1B:
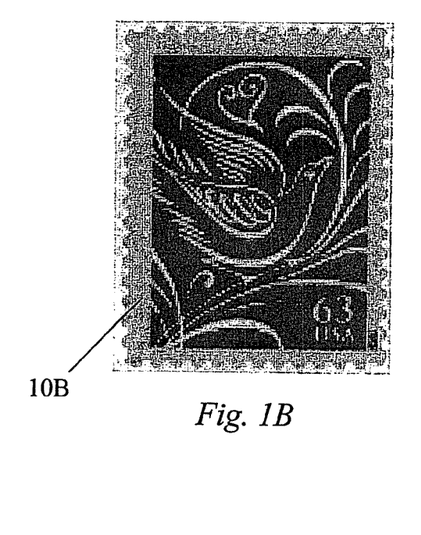
Figure 2A:
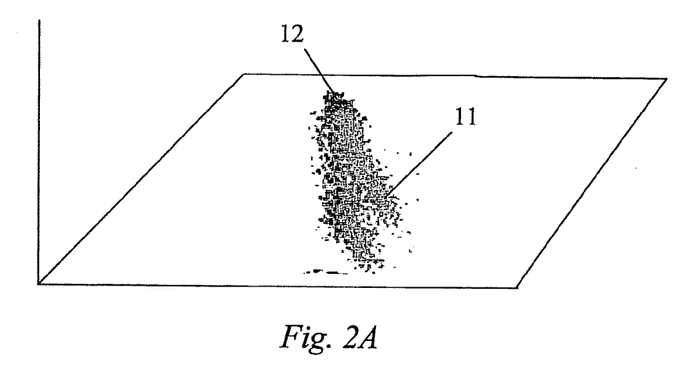
FIGS. 2A and 2B are black and white representations of color space histograms of the stamps shown in FIGS. 1A and 1B respectively.
Figure 2B:
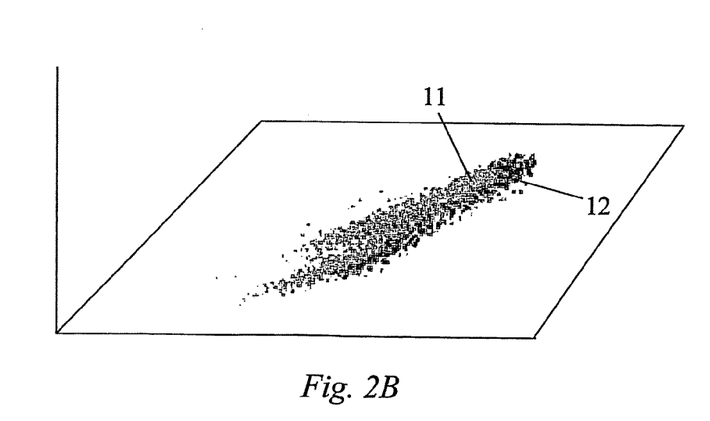

FIGS. 1A-2B illustrate the color space approach for two different but similar stamps. A first stamp 10A is predominantly purple with lighter gray areas, whereas the second stamp 10B is predominantly purple with lighter gray areas. Applying known color space principles to the color data produces a three dimensional color histogram plot for each as shown in FIGS. 2A and 2B showing green dots 11 and red dots 12. The differences can be readily determined and compared by the control computer. This color information can be used to assist in validating the accuracy of a given stamp and establishing its proper value. Color information also can be used to discriminate some fake stamps from genuine ones. This is because different inks have somewhat different properties. Dye based inks formulated for use in an ink jet printer exhibit a different histogram from pigment or dye based inks formulated for intaglio, gravure, or offset printing. Since color space is used as one part of the stamp identification process in the ACR, it can be used to reject stamps where the color space (and inks) are significantly different from the production stamps used to "train" the ACR and produce the stamp catalog (database).

Since variations in the printing process need to be factored into the training set, the color space for any issue of stamps also will have some variation. Therefore, this approach by itself will only trap some fake stamps, mainly those printed with greatly different printing processes, such as ink jet printers. Additional metrics must be employed to achieve more robust counterfeit detection. Use of color space in this manner is one form of using an overt characteristic of the stamp as part of the detection process according to the invention.

Figure 3:
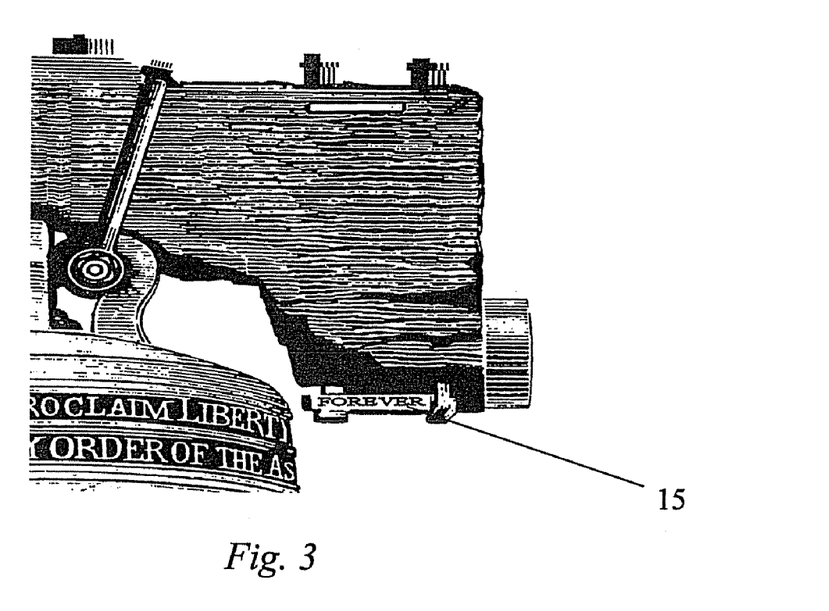
FIG. 3 is a partial image of a Forever stamp showing microprinting.

Microprinting recognition is a second overt characteristic useful as part of the detection process according to the invention. Most offset printed First Class rate definitive postage stamps have micro-printed text embedded in their images. Microprinting methodology is applied to other formats and valued stamps on a case-by-case basis depending on security considerations. The most prominent example is the Forever stamp. The area at the lower right hand side of the wooden yoke contains the word Forever printed in very small print 15 (FIG. 3). This printing is not easily replicated by normal scanners and copiers. In order to resolve this very small printing (one to two points in size), it is necessary to capture the image at high resolution and print the image at high resolution or with a high-resolution screen. This makes counterfeiting difficult. Unfortunately, the printing is not resolvable by the ACR2050 at its current resolution, and thus a higher resolution is needed to use microprinting 15 as a distinguishing characteristic, in particular to distinguish counterfeit microprinting that is blurred at high resolution compared to genuine microprinting.

Figure 4:
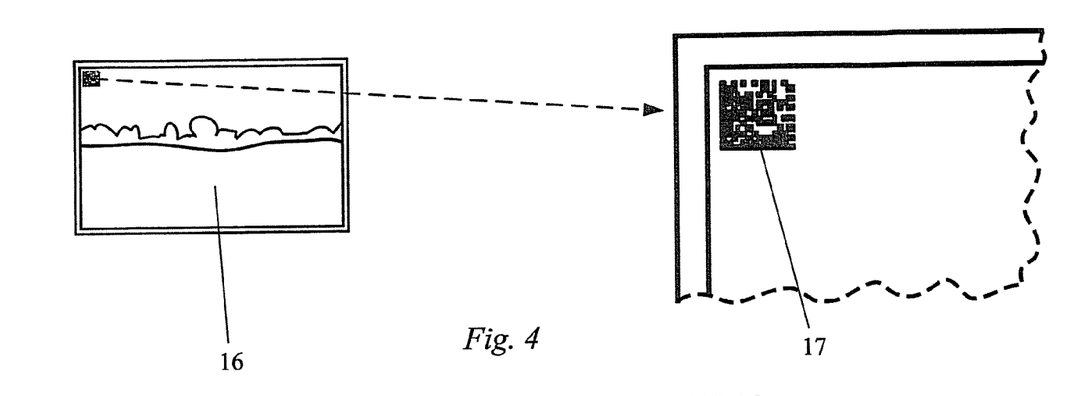
FIG. 4 is a partial image of a stamp showing a matrix code.
Figure 5:
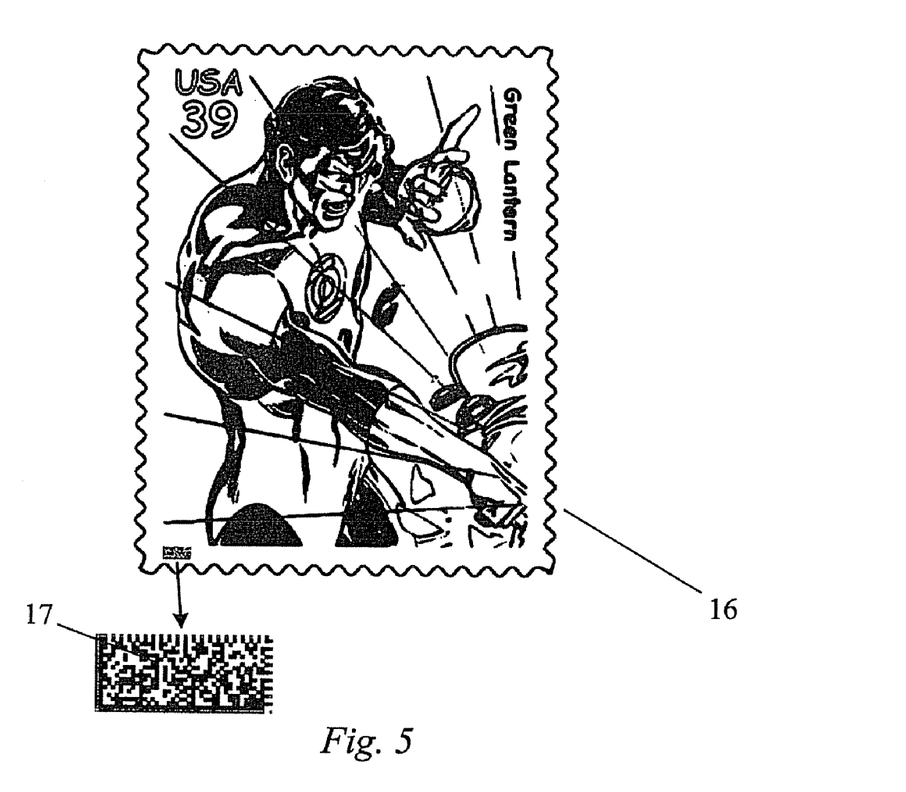
FIG. 5 is a partial image of a stamp showing a matrix microprinted in the stamp margin.

A useful addition to cancellation process would be the accounting of stamps being used and the identification of the printer when more than one printer prints a specific issue or design. For such situations, a matrix code could be added to stamps to provide additional information. The ACR camera is limited to 256 Dots Per Inch (DPI). Therefore, for readability, matrix codes could be printed with an element size that would permit three pixels to scan each element (approximately 85 elements per inch). Testing of the actual data element density would be required to find the optimized resolution of the code. An example of a possible code is depicted in FIG. 4 showing a stamp 16 with a matrix code 17 in the lower left corner. Stamps would be printed as they are currently, but with the addition of a matrix coded pattern. This pattern would not readily reveal the code structure unless viewed under a magnifier. The code does not need to be square. Data Matrix codes, for example, can be printed with a more rectangular aspect ratio (symbols 8×18 to 16×48). Whether or not such patterns would be acceptable to the general public is unknown. This is another form of covert security measure according to the invention. As shown in FIG. 5, a rectangular matrix code 17 could be printed on the border of the stamp 16 to not interfere with the design.

Methods described herein that use the features in stamps as they are printed at present would help to deter casual counterfeiting. Expanding the use of microprinting would likely contribute to a higher level of deterrence. However, sophisticated printers could still replicate these stamp features although the cost to the counterfeiter would be greater.

To improve security radically, other more stringent techniques can be used. These measures would make stamps much more difficult to replicate and add significant cost to counterfeiting them. These approaches involve adjusting the printing process to include more robust security features, covert and overt and utilizing the additional high-resolution camera in the capacity of on-line stamp verification. The manufacturers of printing ink have developed a variety of inks to combat the counterfeiting of various documents, such as lottery tickets, merchandise labels, passports, currency, and financial certificates. These range from inks that are destroyed by erasure (typically, this involves a signature and is not appropriate for stamps) to inks that cannot be copied by normal photocopying machines. The most secure inks have been developed for the printing of currency. Some of those are optically variable (i.e., the color shifts as the document is viewed from different angles) and require very expensive specialized printing presses. It is unlikely that the optically variable level of security is needed for stamps, because it would add expense and limit both the competition for printing and the choice of printing method. However it could be used on a selective basis for stamps of high face value. Within the range of other security inks, many would not add significantly to the cost of the printing process.

The present invention preferably employs a combination of both overt and covert security measures. Overt security includes those methods that can be employed in the printing of stamps that are visible to an individual. These include micro printing, embedded fibers and particles, holograms, photochromic ink, and other visible designs and artifacts that would be difficult to replicate by inexpensive printing methods. These tend to deter counterfeiting by the casual individual. Normally these techniques are difficult to recognize by high speed processing equipment such as that employed by the USPS in its postal processing equipment. These are most suitable for visual examination. Since they are visible, these techniques have some impact on the artwork of the stamp design. Depending upon the selection, this impact could be significant. Some of these techniques such as threads and holograms would add significant cost to stamp printing and these are not considered practical for most stamp issues.

Covert security includes those techniques that are not visible to an individual without special optical systems. This class includes ultraviolet and infrared fluorescing inks and infrared absorbing inks. These inks and dyes can be formulated for application with one or in combination with other printing inks and do not detract from the artwork of the printed stamp. A major benefit of the covert techniques is that many can be detected readily on high-speed mail sorting equipment.

In reviewing the techniques that are available, it appears that some combination of overt and covert techniques would offer the best approach to deter counterfeiting. A main reason to employ both overt and covert measures in combination is that each method addresses a different segment of counterfeiters. Overt measures deter casual counterfeiting and would provide positive reinforcement to postal employees that the stamp is genuine. Covert techniques would enable high-speed systems, such as AFCS200, to validate the authenticity of the stamps as they are processed. Covert security offers another possibility to embed machine-readable information into the stamp printing process that could be used for other purposes, such as inventory tracking, revenue verification, and differentiation among similar stamp designs issued at different rates. This embedded information would not be visible and hence would not be a concern to philatelists.

A cost-effective approach to covert security for stamps involves the use of infrared inks. There are three general classifications of these inks: first, IR/Visible consists of light converting IR inks. This family of inks, when excited with selected laser illumination in the IR region, emits visible light. This is not the normal method of fluorescence; usually a higher frequency (shorter wavelength) excitation source is used to get a substance to fluoresce at a lower frequency (longer wavelength). These inks are not readily available and are somewhat more expensive that other IR inks, but could be used to provide a very high level of security. A second class of IR inks is IR/IR inks. When stimulated by IR at a specific wavelength. These inks emit illumination in the IR range at a longer wavelength. These are only detectable using imaging systems designed to detect the IR emission. Generally, the IR/IR inks are somewhat cheaper than the IR/Visible inks. Maintaining a consistent output level in the IR region could be a production problem to assure machine readability.

A third class of IR inks comprises those that are IR absorbing. These inks appear to be normal printing inks but have special dyes or carbon black added that absorb IR light at specific wavelengths. Some of these inks are formulated so that there is a complementary ink that is visually identical but without the IR absorbing component. This latter group can be used to print stamps that have portions of the image printed normally and other areas printed to absorb IR light. This group of inks provides the ability to hide information within the stamp picture that is readable with only a contrast based. The contrast nature of the detection lends itself to printing coded information, such as a matrix code within the stamp image, but which is invisible to a human. Use of IR absorbing inks for the printing of stamps is a preferred form of covert security measure according to the invention. Printing of the IR security feature is preferably supplemented with one or more overt security methods such as resolution of microprinted text. IR patterns add an additional deterrent to counterfeiting and a forensic tool that is complementary to the automated detection capability made possible by IR security inks. The microprinted patterns, or other visually identifiable features would normally be printed in an area separate from the matrix-coded area.

A benefit of printing coded information is that special information can be embedded for each stamp. This information might contain the stamp issue date, stamp value, printer manufacturer or contract number, or other information that would be useful for tracking inventory and revenue. The data matrix code is ideal for this application. Implementation of a detection system would utilize the higher resolution camera mentioned above. The camera would contain a filter to maximize response in the infrared region. That camera as a second camera would obtain the results from the ACR2050 camera so it would have the type of stamp and its orientation on the mail piece. Validation of the authenticity of the stamp and reading and decoding of any matrix code information would be relatively rapid to assure that the machine control system would obtain any information necessary to divert a mail piece from its normal processing.

Figure 6:
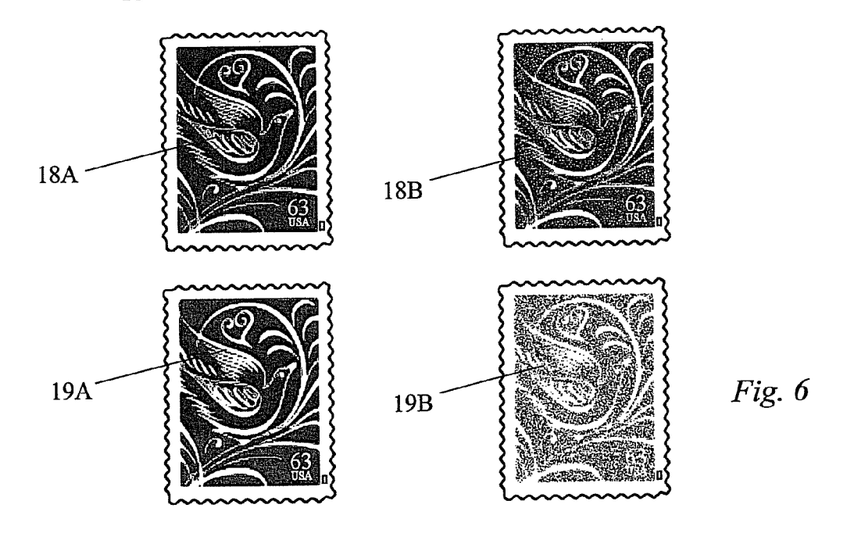
FIG. 6 is a comparison of visible and infrared images for a stamp according to the invention and a counterfeit stamp.

FIG. 6 depicts a valid stamp depicted with carbon black ink vs. a counterfeit stamp printed with dye-based ink. A color Image 18A of the original stamp is not much different visually from the image 19A of the counterfeit stamp. However the IR image 18B of the original stamp is much different (darker) that the IR image 19B of the counterfeit stamp.

Figure 7:
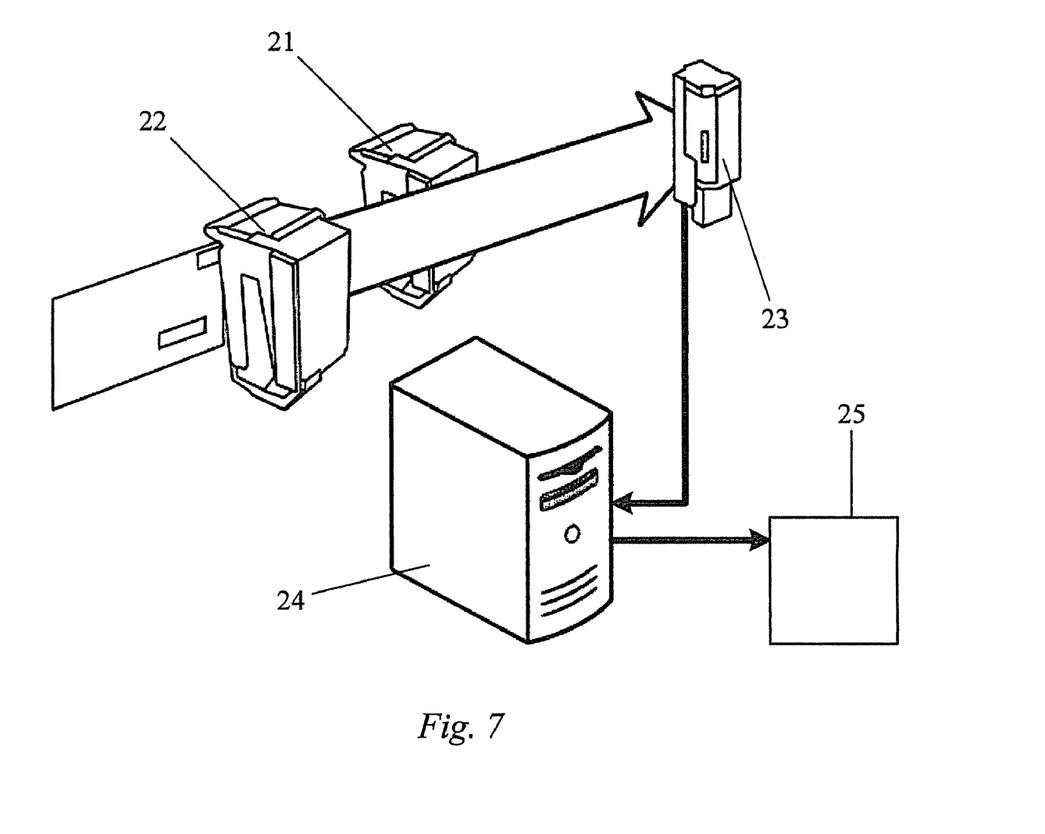
FIG. 7 is a schematic diagram of an AFCS camera system according to the invention.

To improve security further a higher resolution camera 21 dedicated to resolving small patterns on stamps is added to the ACR system 22 (see F*igure*7). This camera 21 would be complemented with additional security features added to stamps to foil counterfeiting. The camera 21 can be configured to scan only the indicia area, because it would be added after the ACR cameras and after the mail pieces are oriented. The logical location for camera 21 is immediately before the cancellation module after all mail pieces have been faced. Thus, only one camera would be required to scan the area about to be canceled. The coded information and IR image from the IT scanner 23 for each stamp would be added to the stamp catalog. These data would be used by the control computer 24 to compare each stamp with this stored covert information. The existing ACR camera(s) 22 would identify the particular stamp(s) on the envelope, and provide that information to the decision logic of the IR camera computer 24 and its associated verification/validation logic. If is necessary to reject the mail piece, a signal is sent to the machine control system 25.

A stamp verification process according to the invention could be implemented that will enable suspect stamps and indicia to be analyzed and diverted for human inspection and potential forensic analysis. These features and actions would be completely configurable so that activation is based upon pre-knowledge of suspect volumes of specific stamp or indicia types that fail one of the security features. Data will be collected during the on-line and off-line operations that establish the thresholds for the triggers.

The addition of the third high resolution camera in the example above a provides the opportunity to compare each stamp against both the ACR2050 stored catalog image and a new infrared image obtained at higher resolution. The combination of the two images will enable suspect stamps to be flagged for subsequent processing and diversion to a special stacker of the AFCS200. Emphasis will be placed on the forensic validation of selected secure features in the images.

The images plus the associated ID code and tracking data can be forwarded to trained personnel for verification of the machine's selection.

In an off-line process according to the invention, stamp images are screened and presented to trained operators with the previously determined criteria and areas highlighted that require further human analysis. For example, by this means a damaged stamp can be ascertained as valid compared to a well-printed fake stamp that should contain selected infrared data that is completely missing in all imagery. Such bogus stamped mail pieces can be rerouted for further inspection by changing the ID tag destination data so that they will be intercepted either at the AFCS200 or at a subsequent machine. Once counterfeit stamps are confirmed or valid stamps are found to be incorrectly selected, data from the inspecting sites will be aggregated and the stamp catalog will be updated accordingly. Thus the stamp catalog according to the invention can contain profiles of characteristics of both valid stamps as well as known counterfeit stamps.

Current techniques to validate the authenticity of stamps rely on outdated techniques of adding phosphorescent material to the stamp or stamp papers. Detection of this material requires special systems that are limited to determining that either a stamp fluoresces or it does not. Therefore, postal personnel cannot validate a counterfeit stamp without using special forensic testing. As disclosed herein, certain other techniques and methods can provide enhanced security to the printing of stamps without need for phosphorescent material. These measures would enable the USPS to phase out the pre-coated phosphorescent paper that is currently being used. An additional benefit of the invention is that it enables intelligence (data) to be added to the stamp that would provide enhanced tracking of stamp type usage and could assist in managing inventory and other logistical purposes. The greatest benefit is that this enhanced information can be read at machine speed while the envelopes are being processed by the facing and cancelling equipment. Mail pieces without the appropriate codes are separated from the mail stream for additional validation.

In a preferred form of the invention, stamps are printed with security features with IR absorbing inks, as well as secure visible patterns or markers. A third camera is added to the ACR2050 subsystem that is optimized for reading in the IR region and integrated with the pre-knowledge derived from the ACR2050 (see FIG. 7). This camera may be implemented in place of the currently envisioned indicia detector to avoid mechanical changes to the machine. Optionally a data matrix code is printed with carbon black or IR inks, which code contains data consistent with the needs of the USPS Stamp Division. In addition, an on-line/off-line screening process is used to identify counterfeit stamps and indicia on a nationwide basis. Human screening of individual mail pieces is intended to add to the stamp catalog, not as a measure to determine what should be done with the individual mail piece. This human review is not comparable to video coding commonly used to determine the address information on a mail piece.

Figure 8:
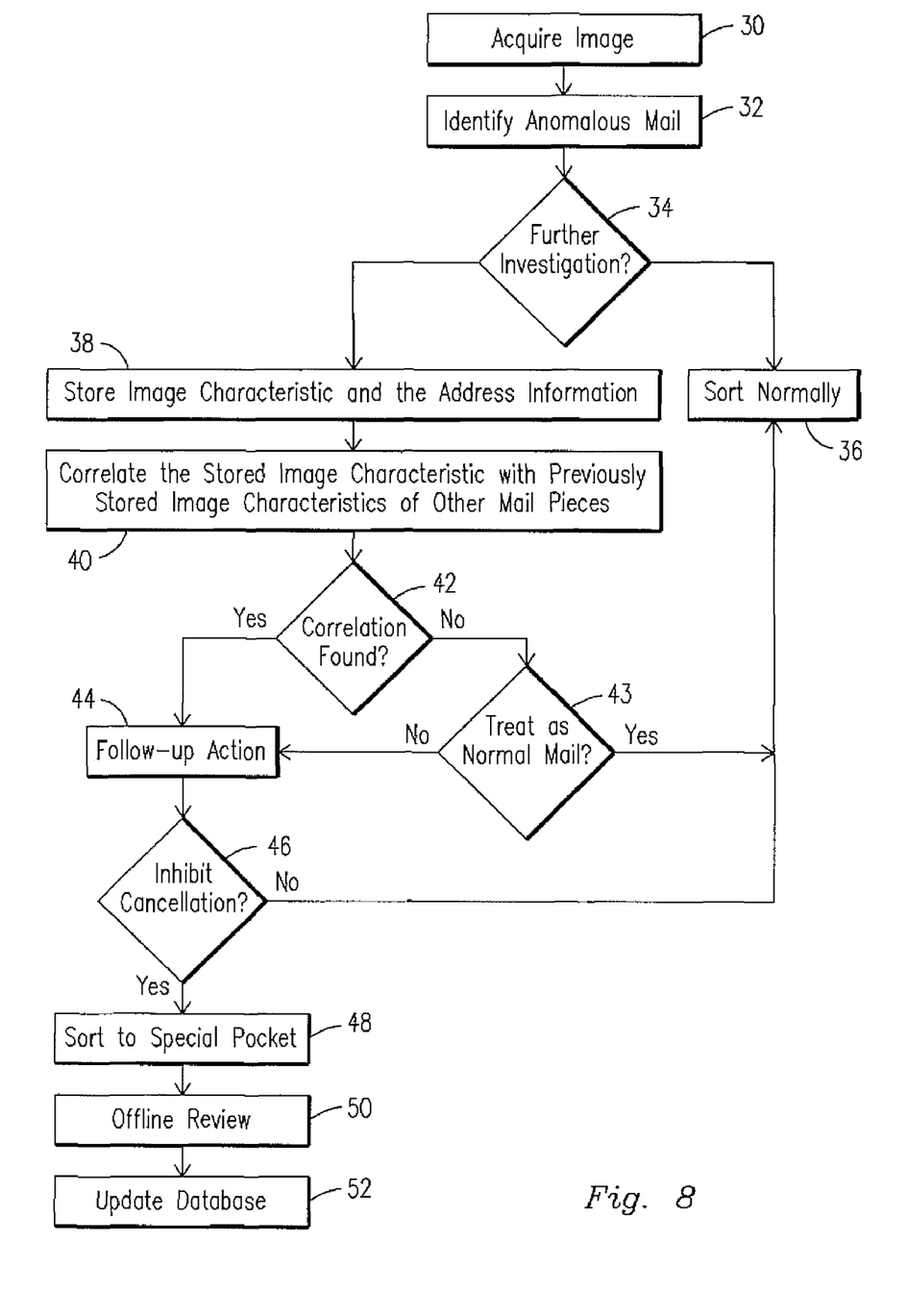
FIG. 8 is a flow chart showing an exemplary method for identifying and tracking mail payment indicia according to an embodiment of the invention.

Referring to FIG. 8 a method for identifying and tracking mail payment indicia, such as stamps or meters on a mailpiece, includes a step 30 of acquiring an image of a mail payment indicia on a mailpiece. For example, the mail piece being imaged may be traveling in a stream of mail being processed through a facer/canceller system. A specialized camera, such as a high resolution camera and/or an infrared (IR) camera may be used to acquire an image of the mail payment indicia of the mailpiece. The acquired image may also include address information on the mail piece. After the image is acquired, the method includes a step 32 of identifying an anomalous mail payment indicia of the mail piece based on a characteristic of the image such as a black and white image characteristic, a color image characteristic, a spectral characteristic, a fluorescent or phosphorescent characteristic, an infrared (IR) image characteristic, a size characteristic, and/or a code included in mail payment indicia, such as a microprint code, of the mail payment indicia. If the image characteristics are sufficiently different from predetermined image characteristics and/or the image characteristics are similar to other known anomalous mail payment indicia, the mail payment indicia may be classified as anomalous (i.e. of interest.) In an embodiment of the invention, the image acquired by a camera may be communicated to an image processor for comparing characteristics of an acquired image to other images stored in a database to determine whether the mail payment indicia is anomalous. The method may further include a machine-implemented decision 34 of determining if the identified anomalous mail payment indicia warrants further investigation. For example, if a stamp on a mailpiece is merely damaged or misapplied, no further investigation may be warranted, and the mailpiece may be returned to the processing stream and sorted normally (step 36). However, when a mailpiece having an anomalous mail payment indicia warrants further investigation, the method may include a step 38 of storing the image characteristic and the corresponding address information, for example, in a database.

The stored image characteristic may be accessible by other mail processing systems to aid in identifying and tracking other mailpieces having similar image characteristics, such as mailpieces having the same version of a suspect counterfeit stamp. The method then includes a step 40 of correlating the stored image characteristic with previously stored image characteristics of other mailpieces having similar anomalous mail payment indicia to associated mailpieces having similar image characteristics. Step 40 may include identifying common addressing information, such as return addresses within a certain geographic region, among the correlated mailpieces to aid in tracking of sources of anomalous mail payment indicia. If a correlation is found (decision 42) as to stamps determined to be fraudulent, a follow up action may be taken (step 44) such as the common addressing information may then be provided to enforcement authorities in a step 44, for example, to assist investigating the source of counterfeit stamps. Optionally the process may also determine whether cancellation should be inhibited (decision (46). If so then the mailpiece is sorted to a special pocket (48) and data concerning it is forwarded to an offline review step (50) carried out by an offline human reviewer. The database is then updated with the results of the review (step 52), which may be to enter the stamp data as a counterfeit or as a false positive (authentic stamp that detects as counterfeit). By this means the process of the invention reviews a large number of stamps automatically and minimizes human review to difficult cases herein the machine implemented criterion do not reach a decision at a desired confidence level.

Such a process represents a great improvement over the ad hoc fraud detection measures in use now. Although the invention has been described with regards to a specific preferred embodiments thereof, variations and modifications will become apparent to those of ordinary skill in the art. Detection of stamps may be supplemented by configuring the system to detect meter markings and more importantly from a financial standpoint, permit mail such as business reply mail. The determination would focus on permits which are counterfeit or paid for but used beyond the extent of payment. Use of a permit in a remote geographical location from the local area of the permit holder may be an indicator of misuse. It is the intent that the appended claims be interpreted as broadly as possible in view of the prior art as to include all such variations and modifications.

The invention claimed is:

1. A method for detection of fraudulent postage indicia, comprising:

introducing a mail piece for processing on an automated facing and canceling machine;

imaging the mail piece by the automated facing and canceling machine to produce an image that includes an image of postage indicia on the mail piece;

comparing the image of the postage indicia to a catalog database that stores a plurality of valid images and a plurality of counterfeit images;

determining, based on the comparison, that the image of the postage indicia does not correspond to any of the plurality of valid images;

determining, based on the comparison, that the image of the postage indicia does not correspond to any of the plurality of counterfeit images;

storing the image of the postage indicia and determinations; and based on the determinations that the image of the postage indicia does not correspond to any of the plurality of valid images and does not correspond to any of the plurality of counterfeit images, inhibiting cancellation of the postage indicia and presenting the image of the postage indicia for human analysis.

2. The method of claim 1, wherein the comparison determines the extent to which the image of the postal indicia matches predetermined criteria stored in the catalog database.

3. The method of claim 1, wherein the comparison comprises a color space analysis and comparison of color space data for image and reference color space data in the catalog database.

4. The method of claim 1, wherein the image is obtained by a visible light scan, and the method further comprises obtaining a second image of the postal indicia using infrared light, and comparing the second image with infrared image reference data to determine if the postage indicia is valid or invalid, wherein valid postage indicia comprise a component visible to humans when illuminated by infrared light but invisible to humans when illuminated by visible light.

5. The method of claim 1, wherein the postage indicia are stamps.

6. The method of claim 1, wherein the comparison is based one or more of black and white image characteristic, a color image characteristic, a spectral characteristic, a fluorescent or phosphorescent characteristic, an infrared (IR) image characteristic, a size characteristic, and a microprint code.

7. The method of claim 1, further comprising storing the image of the postal indicia in a database with corresponding address information for the mail piece.

8. A system for detection of fraudulent postage indicia, comprising an image processor, at least one camera connected to communicate with the image processor, and a catalog database accessible by the image processor; the system configured to perform the steps of:

imaging the mail piece by the at least one camera to produce an image that includes an image of postage indicia on the mail piece;

comparing the image of the postage indicia to a catalog database that stores a plurality of valid images and a plurality of counterfeit images;

determining, based on the comparison, that the image of the postage indicia does not correspond to any of the plurality of valid images;

determining, based on the comparison, that the image of the postage indicia does not correspond to any of the plurality of counterfeit images;

storing the image of the postage indicia and determinations; and based on the determinations that the image of the postage indicia does not correspond to any of the plurality of valid images and does not correspond to any of the plurality of counterfeit images, inhibiting cancellation of the postage indicia and presenting the image of the postage indicia for human analysis.

9. The system of claim 8, wherein the comparison determines the extent to which the image of the postal indicia matches predetermined criteria stored in the catalog database.

10. The system of claim 8, wherein the comparison comprises a color space analysis and comparison of color space data for image and reference color space data in the catalog database.

11. The system of claim 8, wherein the image is obtained by a visible light scan, and the method further comprises obtaining a second image of the postal indicia using infrared light, and comparing the second image with infrared image reference data to determine if the postage indicia is valid or invalid, wherein valid postage indicia comprise a component visible to humans when illuminated by infrared light but invisible to humans when illuminated by visible light.

12. The system of claim 8, wherein the postage indicia are stamps.

13. The system of claim 8, wherein the comparison is based one or more of black and white image characteristic, a color image characteristic, a spectral characteristic, a fluorescent or phosphorescent characteristic, an infrared (IR) image characteristic, a size characteristic, and a microprint code.

14. The system of claim 8, wherein the system is also configured to store the image of the postal indicia in a database with corresponding address information for the mail piece.

* * * * *